UNITED STATES PATENT OFFICE.

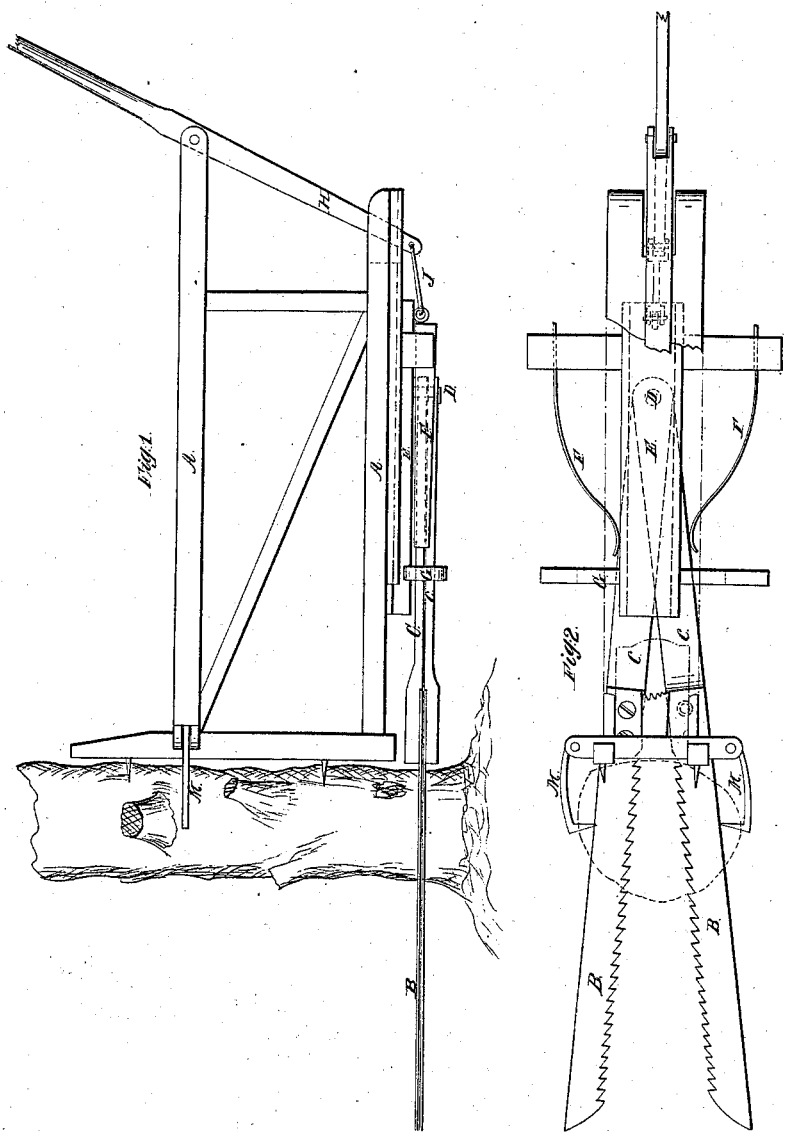

JAMES D. MATTHEWS, OF BOWLING GREEN, OHIO.

IMPROVEMENT IN SAWING-MACHINES.

Specification forming part of Letters Patent No. 56,965, dated August 7, 1866.

*To all whom it may concern:*

Be it known that I, JAMES D. MATTHEWS, of Bowling Green, in the county of Wood and State of Ohio, have invented a new and useful Improvement in Wood-Sawing Machines; and I do hereby declare that the following is a full, clear, and exact description thereof, which will enable others skilled in the art to make and use the same, reference being had to the accompanying drawings, forming part of this specification.

The wood-sawing machine embraced in the present invention consists of two saw-blades hung at one end to a common holder in such a manner as to open and close one upon another, in combination with a suitable frame, in which the said saw-blade holder is so arranged as to be susceptible of a forward-and-backward movement, so that if said saw-blades are opened from each other and placed one upon one side of a log or tree and the other upon the other side of the same, and then moved forward and backward in any proper manner, the said saw-blades will thus saw or cut the said tree or log upon two sides at one and the same time, springs being suitably arranged, in connection with the said saw-blades, to firmly hold them up and against the tree or log upon which they are acting.

In accompanying plate of drawings my improvements in wood-sawing machines are illustrated, Figure 1 being a side elevation of the same, and Fig. 2 a plan view of the under side.

Similar letters of reference indicate like parts.

A in the drawings represents the frame-work of the machine, which is to be of any suitable construction and form to accommodate the various operating parts of the same; B B, the two saw-blades, which are made straight and of an equal length, each being attached to one end of arms c, that at their other ends are hung upon a common fulcrum or center-pin, D, of a common holder-bar, E, arranged upon the under side of the frame-work A so as to freely move forward and backward upon the same.

F are springs secured to the holder E, one upon each side, in suitable position to bear against the arms to which the saw-blades are secured, and thus hold the said saw-blades closed the one upon the other, the guide-bar G, in which the arms of such saw-blades move, being suitably formed to prevent the saw-blades passing by each other.

To the holder carrying the saw-blades, as above explained, the lower end of a vertical lever, H, hung upon a fulcrum at I, in the front end of the frame-work A, is connected through a link-piece or coupling, J, so that if such lever H be swung alternately forward and backward upon its fulcrum-pin the saw-blade holder will be consequently moved forward or backward upon the frame A, as the case may be.

To the end of the frame-work A, from and beyond which the saw-blades project, dog levers or catches M M are hung, for the purpose of enabling the machine to be fastened to the log or tree which is to be sawed by it.

In the use of my improved machine, herein-above explained, it is first secured to the tree or log which is to be sawed by means of its dogs M, at the same time drawing the saw-blades apart or opening them from each other sufficiently to embrace such tree or log, when then moving the lever-handle H alternately forward and backward the said saw-blades are thus made to cut and saw the log or tree, as the case may be, acting upon two of its sides at one and the same time, whereby, as is obvious, both time and labor are economized, the construction and arrangement of the machine being simple, and the operation effective, quick, and expeditious.

Having thus described my invention, I claim as new and desire to secure by Letters Patent—

The saw-blades hung to a common holder in such a manner as to open from and close upon each other, in combination with a frame, A, or its equivalent, to receive the said saw-blade holder, when arranged together and operating substantially in the manner and for the purpose described.

The above specification of my invention signed by me this 1st day of June, 1866.

JAMES D. MATTHEWS.

Witnesses:
 N. A. NOBLE,
 WM. HOOD.